US010587058B2

(12) United States Patent
Kurono et al.

(10) Patent No.: US 10,587,058 B2
(45) Date of Patent: Mar. 10, 2020

(54) TERMINAL BLOCK CONNECTION STRUCTURE FOR ROTARY ELECTRIC MACHINE

(71) Applicant: TOYOTA JIDOSHA KABUSHIKI KAISHA, Toyota-shi, Aichi-ken (JP)

(72) Inventors: Yousuke Kurono, Okazaki (JP); Yasuhiro Makido, Toyota (JP); Ryosuke Sasaki, Miyoshi (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 537 days.

(21) Appl. No.: 15/296,369

(22) Filed: Oct. 18, 2016

(65) Prior Publication Data

US 2017/0110810 A1 Apr. 20, 2017

(30) Foreign Application Priority Data

Oct. 20, 2015 (JP) ................................. 2015-206208

(51) Int. Cl.
*H02K 11/00* (2016.01)
*H01R 9/24* (2006.01)
*H01R 13/405* (2006.01)
*H02K 5/22* (2006.01)
*H02K 3/50* (2006.01)

(52) U.S. Cl.
CPC .............. *H01R 9/24* (2013.01); *H01R 13/405* (2013.01); *H02K 3/50* (2013.01); *H02K 5/225* (2013.01)

(58) Field of Classification Search
CPC .................................................... H02K 5/225

USPC ........................................................... 310/71
See application file for complete search history.

(56) References Cited

U.S. PATENT DOCUMENTS

| 6,894,410 | B2 * | 5/2005 | Kobayashi | ......... | H02K 15/0056 |
| | | | | | 310/239 |
| 7,288,866 | B2 * | 10/2007 | Kuribayashi | .......... | H02K 5/225 |
| | | | | | 310/71 |
| 7,816,827 | B2 * | 10/2010 | Ishizeki | ................. | H02K 3/522 |
| | | | | | 310/71 |
| 8,674,567 | B2 * | 3/2014 | Sakurada | ............... | H02K 5/225 |
| | | | | | 310/71 |

(Continued)

FOREIGN PATENT DOCUMENTS

| JP | 3-70446 A | 3/1991 |
| JP | 2009-044869 A | 2/2009 |
| JP | 2014-128095 A | 7/2014 |

*Primary Examiner* — Alexander Talpalatski
(74) *Attorney, Agent, or Firm* — Sughrue Mion, PLLC

(57) ABSTRACT

A terminal block connection structure for a rotary electric machine includes: a plurality of power lines configured such that respective first end portions are joined to stator coils of a plurality of phases of the rotary electric machine; terminal metal fittings provided in respective second end portions of the plurality of power lines; a terminal block to which the terminal metal fittings are fixed by respective fastening members; and a resin member integrated with an end part of at least one of the terminal metal fittings relative on an opposite side to the power lines across its corresponding fastening member. The terminal block is configured such that a plurality of power-source lines is connected to the terminal block and the terminal metal fittings are fixed to the terminal block by the respective fastening members so that the plurality of power lines is connected to the plurality of power-source lines, respectively.

11 Claims, 13 Drawing Sheets

(56) References Cited

U.S. PATENT DOCUMENTS

| | | | |
|---|---|---|---|
| 9,419,491 B2* | 8/2016 | Egami | H02K 3/50 |
| 9,502,945 B2* | 11/2016 | Okano | H02K 5/225 |
| 9,853,373 B2* | 12/2017 | Kurono | H01R 9/2416 |
| 2009/0108688 A1* | 4/2009 | Miura | H01R 13/6315 |
| | | | 310/71 |
| 2010/0066185 A1* | 3/2010 | Kosaki | H02K 5/225 |
| | | | 310/71 |
| 2013/0264899 A1* | 10/2013 | Goto | H02K 3/50 |
| | | | 310/71 |
| 2015/0244242 A1* | 8/2015 | Okano | H02K 5/225 |
| | | | 310/54 |

* cited by examiner

TERMINAL BLOCK CONNECTION STRUCTURE FOR ROTARY ELECTRIC MACHINE

INCORPORATION BY REFERENCE

The disclosure of Japanese Patent Application No. 2015-206208 filed on Oct. 20, 2015 including the specification, drawings and abstract is incorporated herein by reference in its entirety.

BACKGROUND

1. Technical Field

The present disclosure relates to a terminal block connection structure for a rotary electric machine. The terminal block connection structure includes a plurality of power lines, one ends of which are joined to stator coils of a plurality of phases in the rotary electric machine, and a terminal block to which the other ends of the plurality of power lines are fixed by fastening members. The present disclosure particularly relates to stress reduction at a joining portion between the stator coil and the power line at the time when a vibration is applied to the rotary electric machine.

2. Description of Related Art

A rotary electric machine, which is a motor or a generator, includes a stator and a rotor. One ends of a plurality of power lines corresponding to a plurality of phases are connected to stator coils of the plurality of phases in the stator. Terminal metal fittings provided in the other ends of respective power lines are connected to a terminal block fixed to a case. The terminal block electrically connects a plurality of power-source lines to the plurality of power lines. The plurality of power-source lines is connected to a power-source side (for example, Japanese Patent Application Publication No. 2014-128095 (JP 2014-128095 A)).

SUMMARY

When a vibration is applied to the rotary electric machine at the time of use in a state where one end of the power line is joined to the stator coil and the other end of the power line is fixed to the terminal block like the configuration described in JP 2014-128095 A, an excessive stress may occur at a joining portion between the stator coil and the power line. For example, in a state where the rotary electric machine is provided in a vehicle, a vibration to be transmitted from wheel assemblies along with running of the vehicle and a vibration of an engine may be applied to the rotary electric machine. When a stress to occur in the joining portion becomes excessive, durability of a joining portion between the terminal block and the power line may decrease.

The present disclosure reduces a stress to occur in a joining portion between a stator coil and a power line at the time when a vibration is applied to a rotary electric machine, in a terminal block connection structure for a rotary electric machine.

A terminal block connection structure for a rotary electric machine according to an aspect of the present disclosure includes: a plurality of power lines configured such that respective first end portions are joined to stator coils of a plurality of phases in the rotary electric machine; a plurality of terminal metal fittings provided in respective second end portions of the plurality of power lines, the respective second end portions being provided on an opposite side to the respective first end portions of the plurality of power lines; a terminal block to which the terminal metal fittings are fixed by respective fastening members; and a resin member integrated with a distal side part of at least one of the terminal metal fittings on an opposite side to the power lines across its corresponding fastening member. The terminal block is configured such that a plurality of power-source lines is connected to the terminal block and the terminal metal fittings are fixed to the terminal block by the respective fastening members so that the plurality of power lines is connected to the plurality of power-source lines, respectively.

According to the above aspect, the resin member is integrated with the distal side part of the terminal metal fitting relative to the fastening member used for the fixation between the power line and the terminal block. Hereby, in a case where a vibration tends to increase in a part of the power line on one end side relative to the metal fitting, the resin member relaxes the vibration. This makes it possible to reduce a stress to occur in a joining portion between the stator coil and the power line at the time when the vibration is applied to the rotary electric machine.

Further, in the above aspect, the resin member may connect the plurality of terminal metal fittings to each other such that the resin member is integrated with distal side parts of the terminal metal fittings of the plurality of power lines on the opposite side to the power lines across the fastening members.

According to the above configuration, the plurality of terminal metal fittings is connected by the resin member, so vibrations of respective terminal metal fittings can be restrained more. Hereby, in a case where a vibration tends to increase in parts of the power lines on one end side relative to the terminal metal fittings, a vibration relief effect of the resin member is increased. This makes it possible to further reduce the stress to occur in the joining portion between the stator coil and the power line. Further, since the plurality of terminal metal fittings is connected to each other, it is possible to improve workability at the time of assembling the terminal metal fittings to the terminal block.

According to the terminal block connection structure of the rotary electric machine of the present disclosure, it is possible to reduce a stress to occur in the joining portion between the stator coil and the power line at the time when a vibration is applied to the rotary electric machine.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

The following describes an embodiment of the present disclosure with reference to the drawings. A shape, a material, and a number to be described below are exemplifications for descriptions, and they can be changed appropriately according to a specification of a terminal block connection structure for a rotary electric machine. In the following description, similar elements in all drawings have the same reference sign. Note that a stator constitutes a rotary electric machine in combination with a rotor fixed to a rotating shaft. The rotary electric machine is used as a motor or a generator, or a motor generator having functions of both the motor and the generator. For example, the rotary electric machine is used as a motor generator for a hybrid vehicle provided with an engine and a motor generator.

Figure 1:
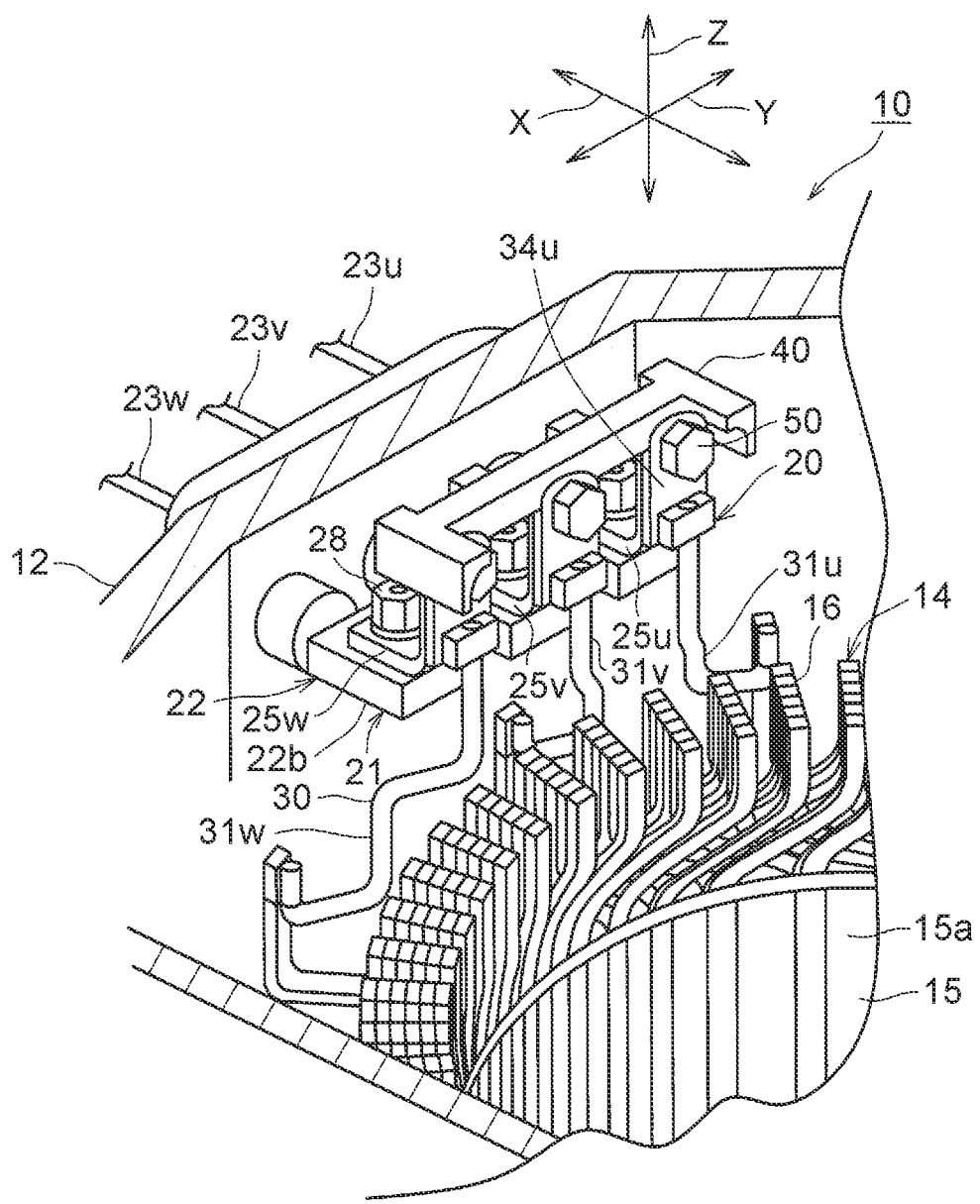
FIG. 1 is a perspective view of a stator fixing structure including a terminal block connection structure for a rotary electric machine according to an embodiment when viewed inside from outside a case.
Figure 2:
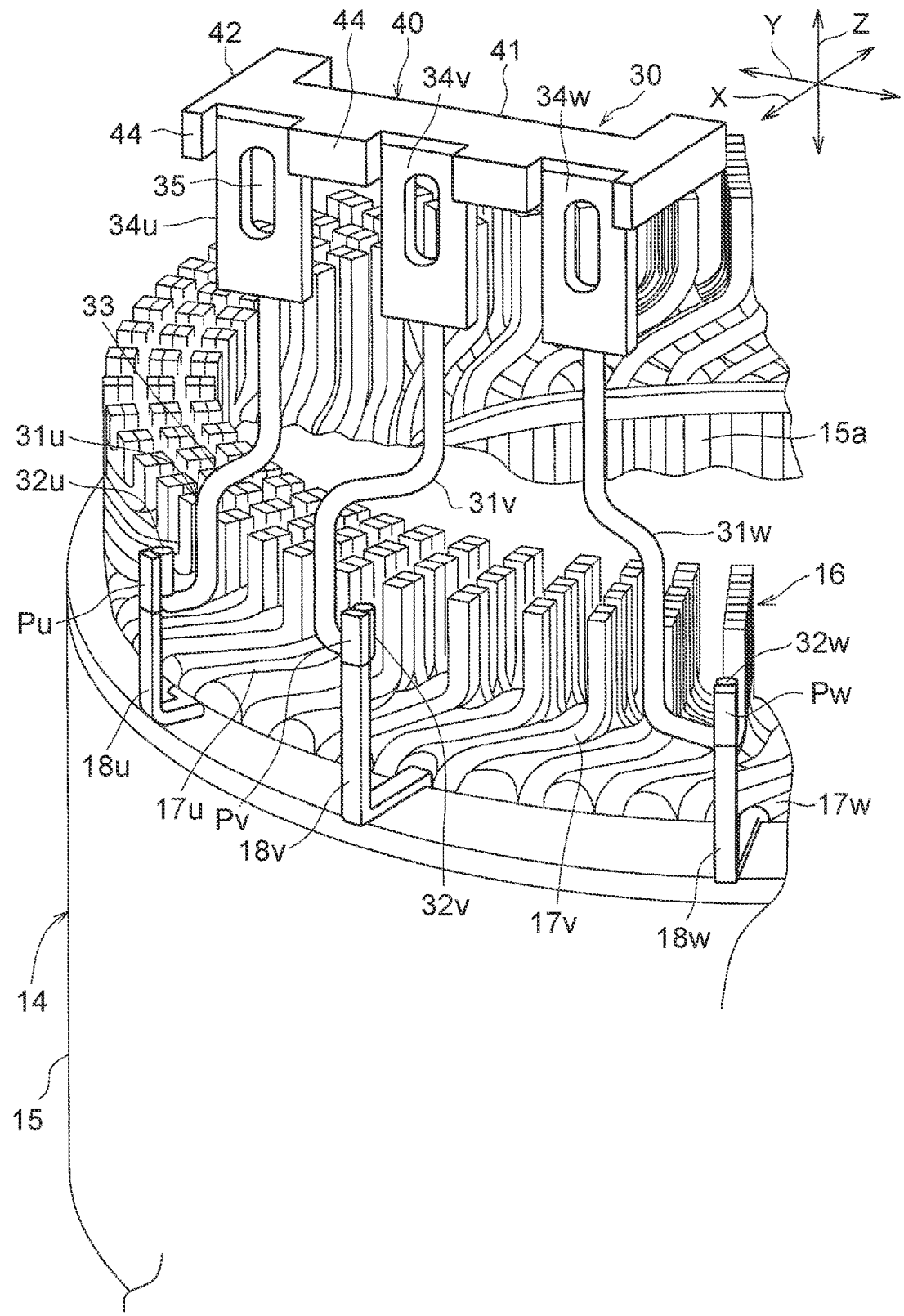
FIG. 2 is a perspective view illustrating a state where only a member on a power-line side is connected to a stator coil in the terminal block connection structure.

FIG. 1 is a perspective view of a stator fixing structure 10 including a terminal block connection structure 20 for a rotary electric machine according to the embodiment when viewed inside from outside a case 12. FIG. 2 is a perspective view illustrating a state where only a member on a side of power lines 31u, 31v, 31w is connected to a three-phase stator coil 16 in the terminal block connection structure 20 (FIG. 1).

The stator fixing structure 10 includes the case 12, a stator 14 fixed to an inner side of the case 12, and the terminal block connection structure 20. The stator 14 includes a stator core 15 and the three-phase stator coil 16.

The terminal block connection structure 20 includes a terminal block 21 fixed to the case 12, and a power-line integrated member 30 including three power lines 31u, 31v, 31w.

The power-line integrated member 30 includes: the three power lines 31u, 31v, 31w connected to the three-phase stator coil 16; and a resin member 40 integrated with distal ends of the three power lines 31u, 31v, 31w. In the embodiment, the resin member 40 can reduce stresses to occur in joining portions Pu, Pv, Pw (FIG. 2) between the three-phase stator coil 16 and the power lines 31u, 31v, 31w when a vibration is applied at the time of use of the power-line integrated member 30 in the rotary electric machine. This will be described later, more specifically.

The terminal block 21 is used to connect the three power lines 31u, 31v, 31w to three power-source lines 23u, 23v, 23w connected to a power-source side (not shown), respectively. The three power lines 31u, 31v, 31w and the three power-source lines 23u, 23v, 23w correspond to three phases. More specifically, the power line 31u and the power-source line 23u correspond to a U phase, the power line 31v and the power-source line 23v correspond to a V phase, and the power line 31w and the power-source line 23w correspond to a W phase. In the following description, the power lines 31u, 31v, 31w may be generally referred to as the power line 31, and the power-source lines 23u, 23v, 23w may be generally referred to as the power-source line 23.

The following describes the stator 14 more specifically, with reference to FIGS. 1, 2. The stator core 15 of the stator 14 has a generally toric shape and teeth 15a project from a plurality of positions in a circumferential direction on an inner peripheral surface. The three-phase stator coil 16 of the stator 14 includes a U-phase stator coil 17u, a V-phase stator coil 17v, and a W-phase stator coil 17w.

The stator coils 17u, 17v, 17w of respective phases are wound around the plurality of teeth 15a by distributed winding. The stator coils 17u, 17v, 17w of respective phases are formed by joining a plurality of conductor segments by welding. For example, the conductor segment is formed by bending a flat wire, which is a conductor wire having a rectangular section.

As illustrated in FIG. 2, the stator coils 17u, 17v, 17w of respective phases include coiled portions wound around a plurality of teeth 15a, and coil terminals 18u, 18v, 18w of three phases. Each of the coil terminals 18u, 18v, 18w is formed as follows: one end of a connected coil body obtained by electrically connecting a plurality of coiled portions in series for each phase is extended generally outwardly in a radial direction of the stator 14, and then bent generally at a right angle along an axial direction (an up-down direction in FIG. 2) of the stator 14. The other ends (not shown) of the stator coils 17u, 17v, 17w of the three phases are connected to a bus bar (not shown) that forms a neutral point.

One ends 32u, 32v, 32w of the power lines 31u, 31v, 31w of the U, V, W phases are connected to the coil terminals 18u, 18v, 18w of the three phases by welding (e.g., TIG welding). The power line 31 includes a power-line main body 33, and a terminal metal fitting 34u, 34v, 34w provided in the other end of the power-line main body 33.

The power-line main body 33 is constituted by a conductor element wire and an insulation coating covering the conductor element wire except both ends thereof.

The terminal metal fitting 34u, 34v, 34w is made of a conductive material such as metal and formed in a plate shape. The terminal metal fitting 34u, 34v, 34w has a bolt insertion hole 35 formed in an intermediate part thereof. In the following description, the terminal metal fittings 34u, 34v, 34w may be generally referred to as the terminal metal fitting 34.

Figure 3:
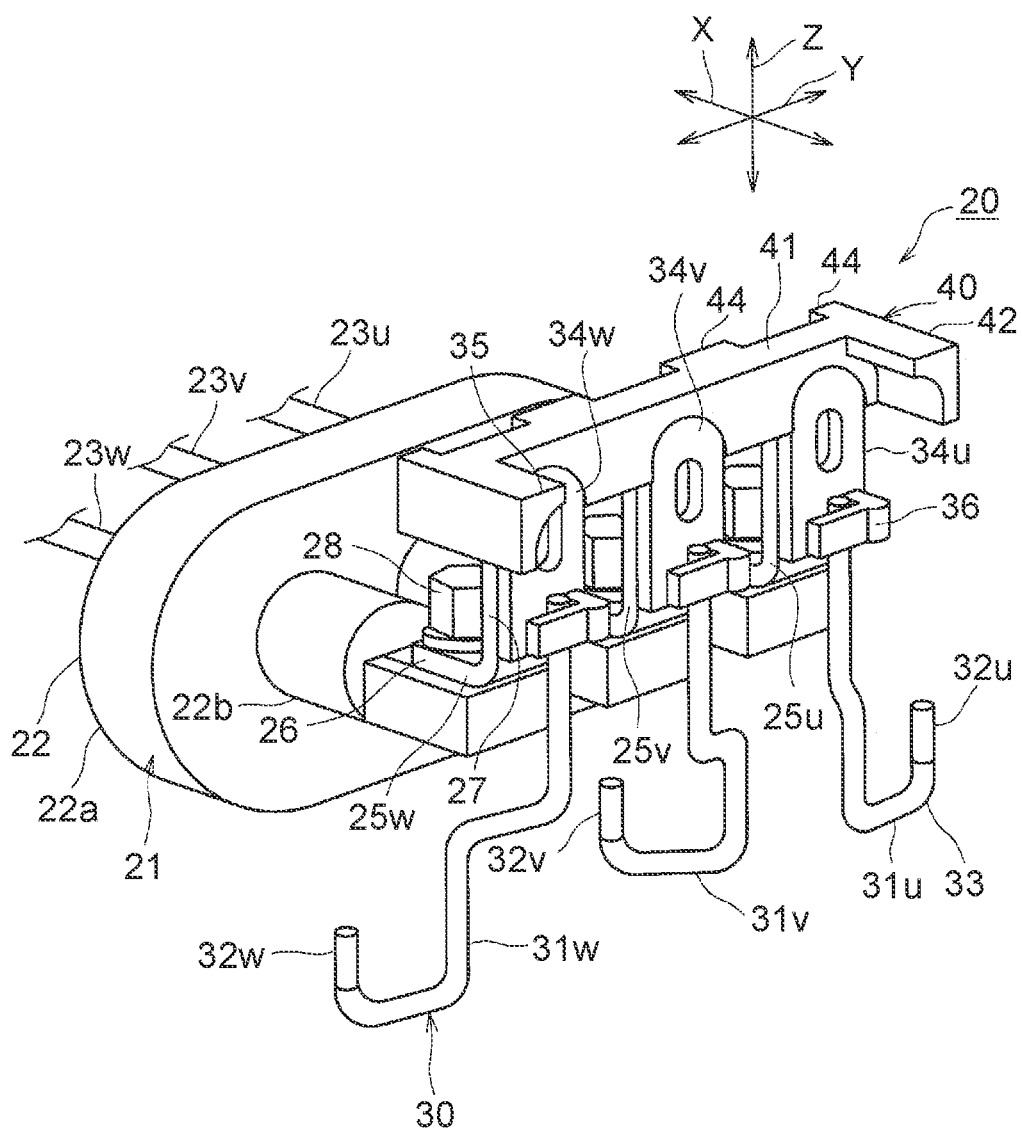
FIG. 3 is a perspective view illustrating the terminal block connection structure taken out from FIG. 1 with some parts being omitted.
Figure 4:
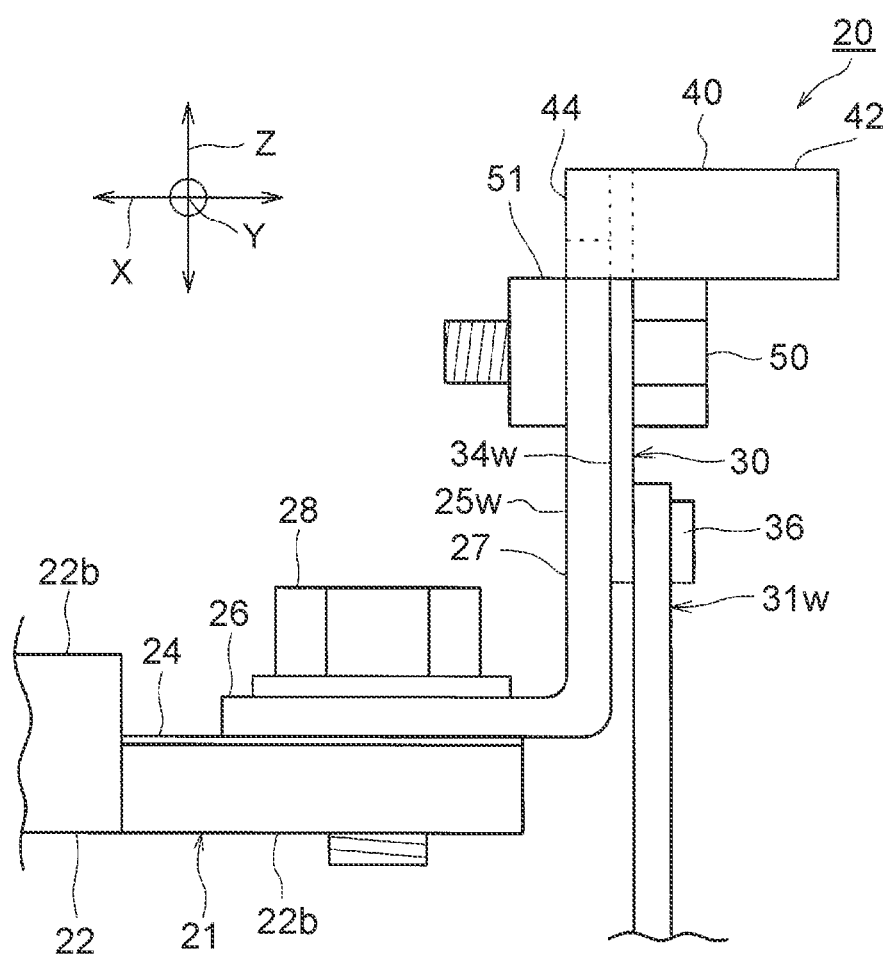
FIG. 4 is a view of the terminal block connection structure in FIG. 3 when viewed from a left side to a right side.
Figure 5:
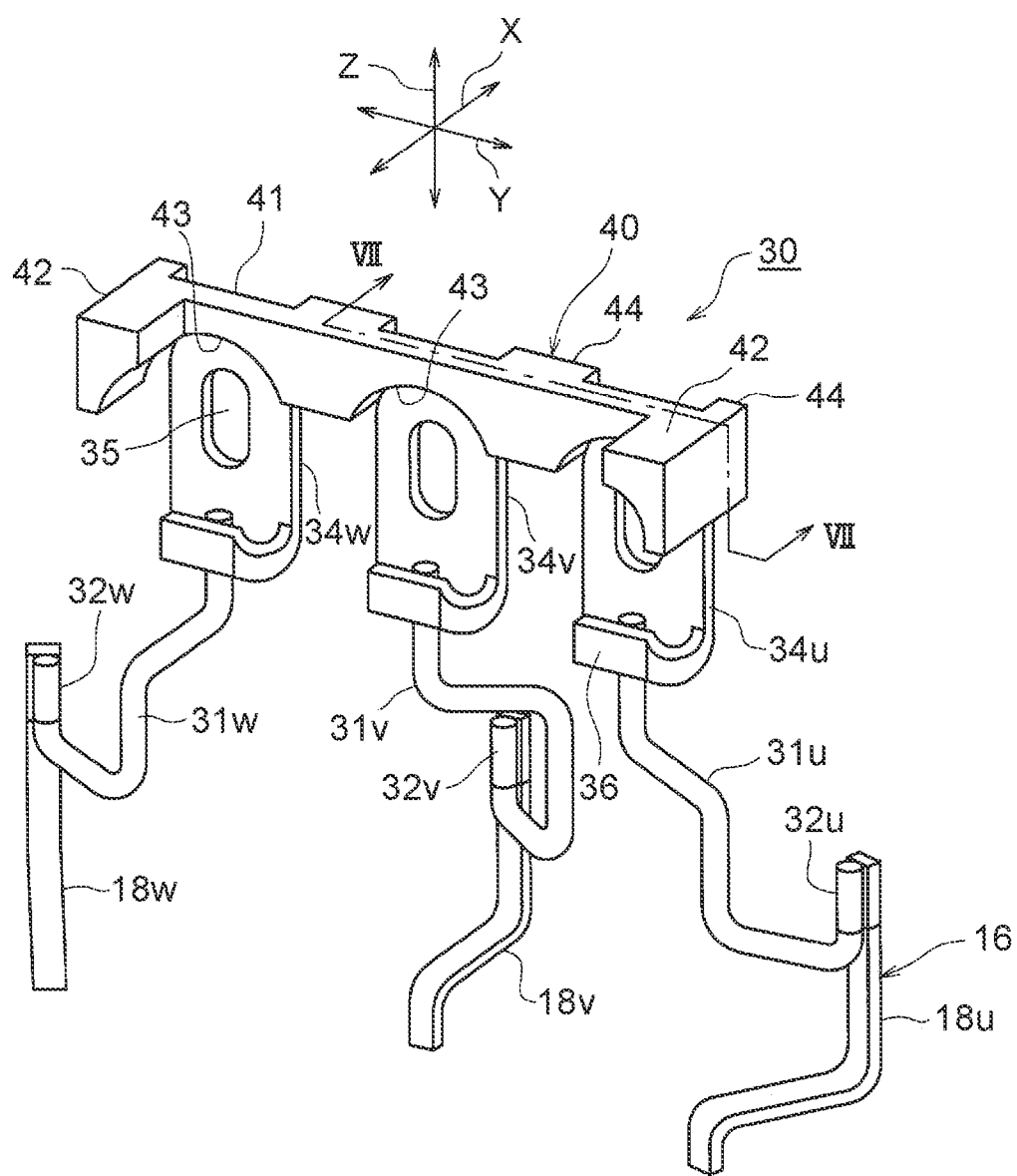
FIG. 5 is a perspective view of the member on the power-line side illustrated in FIG. 2, when viewed from an opposite side to FIG. 2.
Figure 6:
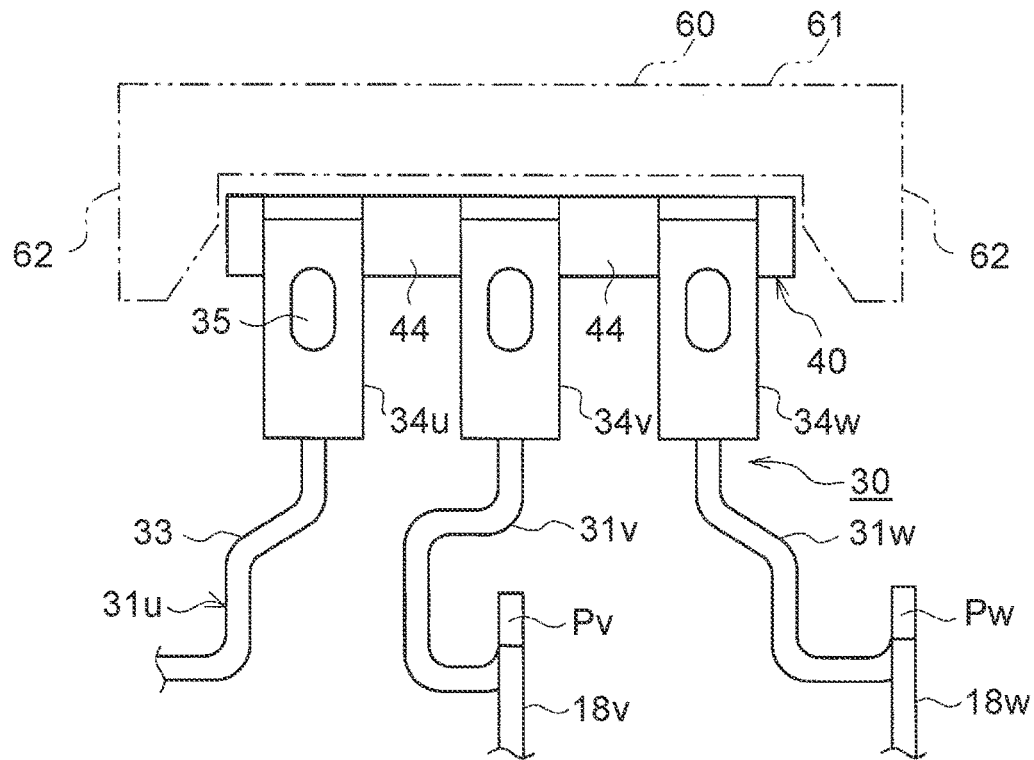
FIG. 6 is a front view of the member on the power-line side illustrated in FIG. 2.

FIG. 3 is a perspective view illustrating the terminal block connection structure 20 taken out from FIG. 1 with some parts being omitted. FIG. 4 is a view of the terminal block connection structure 20 in FIG. 3 when viewed from a left side to a right side. FIG. 5 is a perspective view of a member on a power-line-31 side illustrated in FIG. 2, when viewed from an opposite side to FIG. 2. FIG. 6 is a front view of the member on the power-line-31 side illustrated in FIG. 2.

A caulking portion 36 for connecting the power-line main body 33 in a caulking manner is formed in an end of the terminal metal fitting 34 on a power-line-main-body-33 side. The caulking portion 36 is a tongue piece extending outward from a peripheral edge of the terminal metal fitting 34. At the time of connecting the power-line main body 33 to the terminal metal fitting 34, in a state where the other end of the power-line main body 33 is placed on a surface of the terminal metal fitting 34, the caulking portion 36 is bent toward the surface of the terminal metal fitting 34 and is further pushed so as to caulk and fix the other end of the power-line main body 33.

The resin member 40 forms the power-line integrated member 30 together with the three power lines 31. The resin member 40 is made of insulating resin. The resin member 40 includes a body portion 41 elongated along one direction (a Y-direction), and two inward projections 42 formed integrally with both ends of the body portion 41. The two inward projections 42 are provided so as to project toward an opposite side (a front side on a plane of paper in FIGS. 3, 5, 6, a right side in FIG. 4) to the terminal block 21 (FIG. 1) in an X-direction perpendicular to a longitudinal direction (the Y-direction) of the body portion 41. In a case where the power lines 31 are connected to the coil terminals 18u, 18v, 18w of the three-phase stator coil 16 by welding, and in a case where the terminal metal fittings 34 of the power lines 31 are connected to the terminal block 21 by bolts, the inward projections 42 are used for positioning by a jig. At this time, as will be explained below, the two inward projections 42 are externally clamped by the jig and held in place.

The resin member 40 is provided so as to be integrated with distal side parts of the three terminal metal fittings 34. At this time, the distal side parts of the three terminal metal fittings 34 are resin-molded by the resin member 40. Hereby, the resin member 40 connects the three terminal metal fittings 34 to each other.

Further, recessed portions 43 are formed on a lower surface of the resin member 40 on an opposite side to the terminal block 21 such that the recessed portions 43 are placed at three positions distanced from each other in the longitudinal direction (the Y-direction), so that the resin member 40 is placed so as to be distanced outward from peripheral edges of upper ends of the insertion holes 35 in the terminal metal fittings 34 by a predetermined distance or more. A sectional shape of the recessed portion 43 is a circular arc shape. The recessed portions 43 prevent heads of the bolts 50 from interfering with the resin member 40 when the bolts 50 (FIG. 1) as fastening members are connected to the terminal metal fittings 34. Further, the terminal metal fittings 34 are connected to the after-mentioned L-shaped bus bars 25u, 25v, 25w (FIG. 1) by the bolts 50. In this state, the resin member 40 is provided on an upper side relative to arrangement positions of the bolts 50 in the terminal metal fittings 34.

Figure 7:
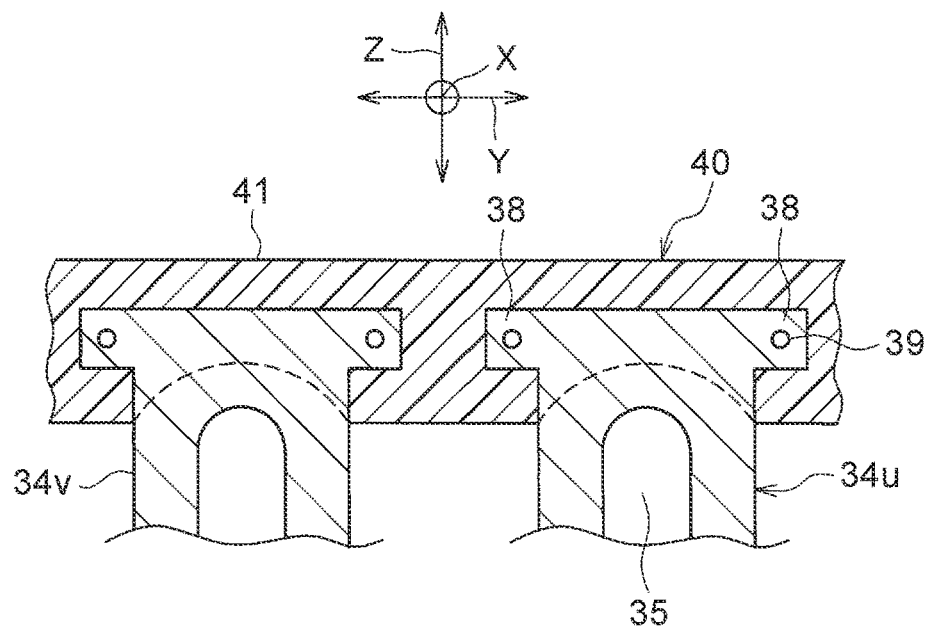
FIG. 7 is a sectional view taken along a line VII-VII of FIG. 5.

With reference to FIG. 7, the following describes a connection portion between the resin member 40 and the terminal metal fitting 34. FIG. 7 is a sectional view taken along a line VII-VII in FIG. 5. The terminal metal fitting 34 has a generally rectangular plate shape except the caulking portion 36 (FIG. 5), and the insertion hole 35 is formed in the intermediate part thereof. Further, projections 38 are formed on both side surfaces of an upper end of the terminal metal fitting 34 in a width direction (the Y-direction). The projections 38 project outward in the width direction. A through-hole 39 is formed in each of the projections 38.

A part including the projections 38 in a distal end as the upper end of the terminal metal fitting 34 is embedded in the body portion 41 of the resin member 40 and hereby resin-molded. The resin member 40 can be formed by injection molding of resin.

At the time of resin molding of the resin member 40, part of the resin member 40 enters the through-holes 39 of the projections 38. This accordingly makes it possible to improve a connection strength between the terminal metal fitting 34 and the resin member 40 and to prevent the projections 38 from moving in a direction where the projections 38 fall out of the resin member 40.

As illustrated in FIGS. 2 to 5, outward projections 44 projecting toward a terminal-block-21 side (a front side on a plane of paper in FIG. 2, a back side on the plane of paper in FIG. 3, 5, a left side in FIG. 4) are formed in the body portion 41 of the resin member 40 at four positions distanced from each other in the longitudinal direction (the Y-direction). The outward projection 44 projects from the body portion 41 in a rectangular-solid shape. The outward projections 44 are provided so as to prevent the body portion 41 from curving to decrease a distance between the inward projections 42 of the body portion 41 (FIG. 5) at the time of molding the resin member 40, and also to prevent a decrease in dimension accuracy of the resin member 40 due to the curving. Further, two intermediate outward projections 44 in the longitudinal direction among the outward projections 44 are used such that a jig is pressed against them for positioning of the power lines 31 at the time of joining the power lines 31 to the three-phase stator coil 16 as will be described later. A projection height of the outward projections 44 in the X-direction is smaller than a projection height of the inward projections 42 in the X-direction.

In order to achieve good positioning by the jig and to stably clamp and hold the resin member 40, it is preferable that the resin member 40 have parallel planar faces on both side surfaces in the longitudinal direction. A groove may be formed on the planar face. Further, in order to form reference planes against which the jig is pressed, it is preferable that an upper face of the resin member 40 have a planar face perpendicular to the planar faces on both side surfaces in the longitudinal direction. For the same reasons, it is preferable that distal surfaces of the two intermediate outward projections 44 among the outward projections 44 of the resin member 40 have planar faces perpendicular to the planar faces on both side surfaces in the longitudinal direction.

As illustrated in FIGS. 3, 4, the terminal block 21 includes a terminal block body 22 and L-shaped bus bars 25u, 25v, 25w. The terminal metal fittings 34 of the power lines 31 are fixed to the case 12 (FIG. 1) via the terminal block 21.

Figure 8:
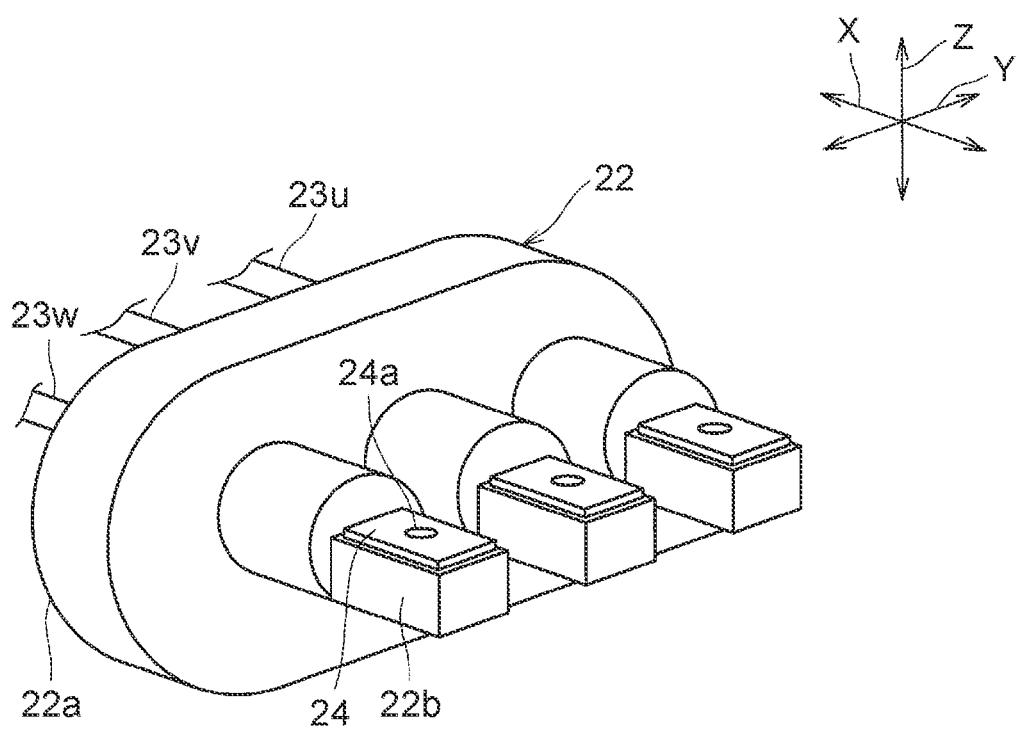
FIG. 8 is a perspective view illustrating a terminal block body.

FIG. 8 is a perspective view illustrating the terminal block body 22. The terminal block body 22 includes an outer base portion 22a and inner base portions 22b. The base portions 22a, 22b are made of insulating resin. The outer base portion 22a has a tubular shape having a generally elliptical section, and one end (a left end in FIG. 8) of the outer base portion 22a is opened. External relay terminals (not shown) are placed inside the outer base portion 22a in a state where the external relay terminals are exposed outside, and the power-source lines 23u, 23v, 23w of three phases are connected to the external relay terminals. The power-source lines 23u, 23v, 23w of three phases are connected to terminals of three phases of an inverter (not shown) connected to a direct-current power source outside the case 12 (FIG. 1). The inverter converts a direct current from the direct-current power source into an alternating current, so as to supply a three-phase alternating current to the three-phase stator coil 16 via the power-source lines 23, the terminal block 21, and the power lines 31.

The inner base portions 22b are three columnar parts projecting from the other end (a right end in FIG. 8) of the outer base portion 22a. At the time of attaching the terminal block body to the case 12, three insertion holes are formed in the case 12 in advance, and three inner base portions 22b are inserted into the insertion holes from outside the case 12. The after-mentioned L-shaped bus bars 25u, 25v, 25w (FIGS. 3, 4) are attached to the inner base portion 22b in a state where the inner base portions 22b are inserted into the case 12.

An internal relay terminal 24 is provided on a top face of the inner base portion 22b in an exposed state. The internal relay terminal 24 is made of metal having conductivity and has a plate shape. An electric conductor (not shown) for electrically connecting the internal relay terminal 24 to the external relay terminal is placed inside the inner base portion 22b.

As illustrated in FIGS. 3, 4, the L-shaped bus bars 25u, 25v, 25w are three relay portions made of an electrical conducting material, e.g., metal and placed on the internal relay terminals 24 of the inner base portions 22b. The L-shaped bus bars 25u, 25v, 25w are connected to the internal relay terminals 24. The terminal metal fittings 34 as distal ends of the three power lines 31 (FIG. 6) are connected to the three L-shaped bus bars 25u, 25v, 25w, respectively. The three L-shaped bus bars 25u, 25v, 25w correspond to three phases, i.e., the U phase, the V phase, and the W phase, respectively. In the following description, the L-shaped bus bars 25u, 25v, 25w may be generally referred to as the L-shaped bus bar 25.

The L-shaped portion 25 is constituted by a first plate portion 26 and a second plate portion 27 extending in respective directions generally perpendicular to each other. The first plate portion 26 is placed on an upper face of the internal relay terminal 24. The second plate portion 27 extends upward (in FIG. 4) from one end (a right end in FIG. 4) of the first plate portion 26 so as to extend in a direction (a Z-direction) along the terminal metal fitting 34 of the power line 31.

The first plate portion 26 is connected to the internal relay terminal 24 by a bolt 28. At this time, a threaded part of the bolt 28 is passed through an insertion hole (not shown) of the first plate portion 26 and an insertion hole 24a (FIG. 8) of the internal relay terminal 24 and is connected to a nut (not shown) or a threaded hole (not shown) formed in the inner base portion 22b of the terminal block 21.

Further, the terminal metal fitting 34 of the power line 31 is connected to the second plate portion 27 by the bolt 50 as a fastening member. At this time, a threaded part of the bolt 50 is passed through an insertion hole 35 (FIGS. 5, 6) of the terminal metal fitting 34 and an insertion hole (not shown) of the second plate portion 27, and is connected to a nut 51 (FIG. 4). Hereby, the second plate portion 27 is connected to a distal end of the power line 31 of a corresponding phase by the bolt 50. FIG. 4 illustrates a state where the nut 51 is fixed to the second plate portion 27 in advance by bonding or welding, but the nut 51 may be provided separately from the second plate portion 27.

The terminal block 21 is formed by connecting the three L-shaped bus bars 25 to the terminal block body 22. The internal relay terminals 24 of the terminal block 21 are connected to the terminal metal fittings 34 of the power lines 31 via the L-shaped bus bars 25. Hereby, the power-source lines 23 of the three phases are electrically connected to the power lines 31 of the three phases.

The following describes a connecting method for connecting the terminal block 21 to the power-line integrated member 30. First, as illustrated in FIG. 2, the power-line integrated member 30 is formed by integrating the three power lines 31 with the resin member 40. The power-line integrated member 30 is connected to the coil terminals 18u, 18v, 18w of the stator coil 16 by welding. At this time, the terminal block body 22 and the terminal metal fittings 34 of the power lines 31 as illustrated in FIG. 3 are connected to each other via the L-shaped bus bars 25, which are different members from the terminal metal fittings 34. This makes it possible to attain improvement of workability of a connection operation between the power lines 31 and the three-phase stator coil 16 (FIG. 2).

Figure 9:
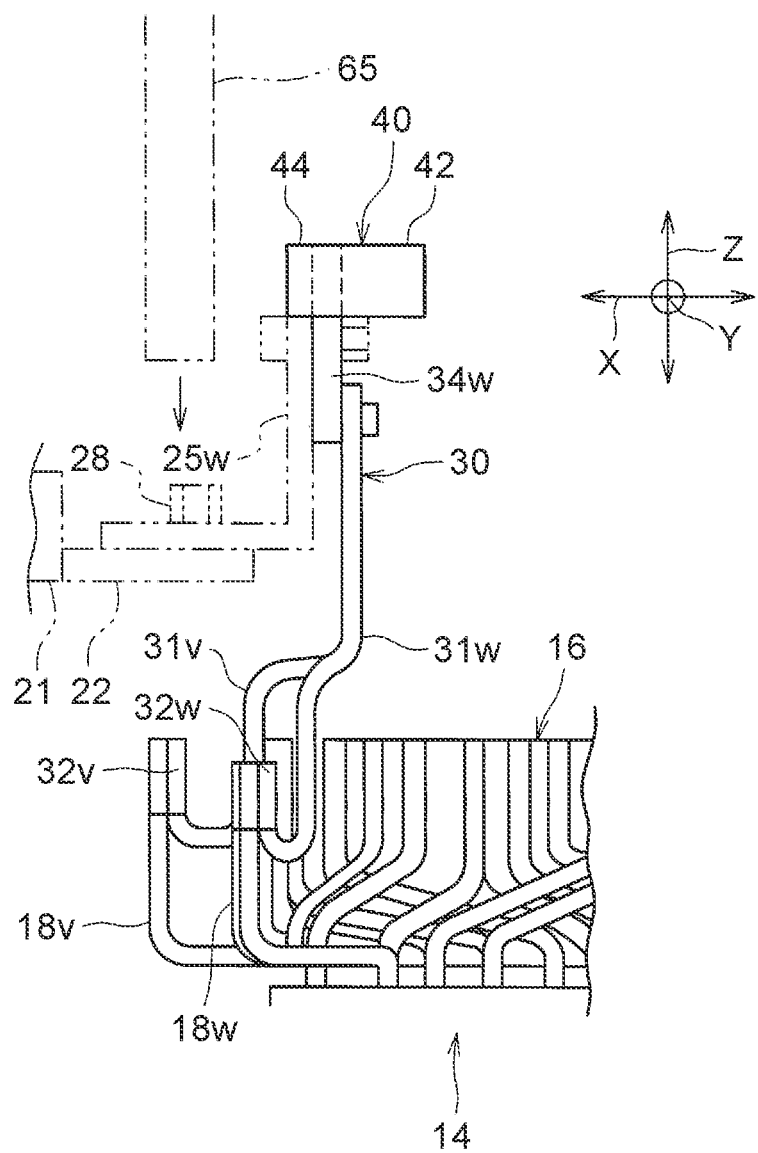
FIG. 9 is a view of an operation of connecting the member on the power-line side to the stator coil in the terminal block connection structure, when viewed from an outer peripheral side of the stator coil.
Figure 10:
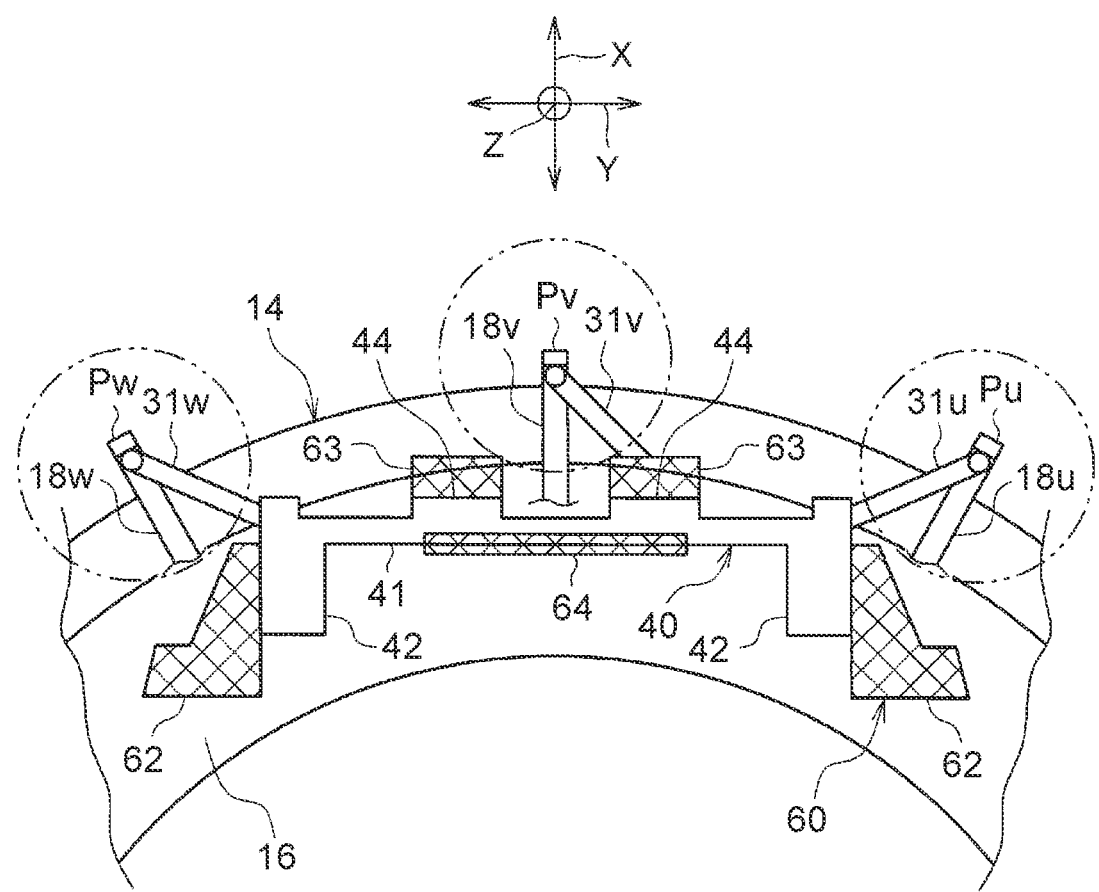
FIG. 10 is a view illustrating joining portions between the power lines and the stator coil when viewed from an upper side to a lower side in FIG. 6, and positions at which a jig is pressed against a resin member.

The following describes this point with reference to FIG. 9. FIG. 9 is a view of an operation of connecting the power-line integrated member 30 as a member on the power-line-31 side to the three-phase stator coil 16 in the terminal block connection structure 20, when viewed from an outer peripheral side of the three-phase stator coil 16. When the connection operation is performed, the stator 14 is first placed such that its axial direction is along the up-down direction. Then, the power-line integrated member 30 is held by a jig 60 (FIGS. 6, 10). At this time, as illustrated in FIG. 6, the jig 60 includes a body portion 61 and two grip portions 62 supported by the body portion 61, and a distance between the two grip portions 62 is changeable. The two inward projections 42 of the resin member 40 are clamped and held by the two grip portions 62.

FIG. 10 is a view illustrating joining portions Pu, Pv, Pw between the power lines 31 and the three-phase stator coil 16 and positions where the jig 60 is pressed against the resin member 40, when viewed from an upper side to a lower side in FIG. 6. In FIG. 10, in the jig 60, the two grip portions 62 and three imposition portions 63, 64 pressed against the resin member 40 are indicated by oblique grid portions. Planar side faces of the two grip portions 62 are pressed against respective outer side surfaces of the inward projections 42 of the resin member 40. Further, planar side faces of the two imposition portions 63, facing in the X-direction, are pressed against distal surfaces of the two intermediate outward projections 44 in the longitudinal direction (the Y-direction) among the outward projections 44. Further, a side face of the remaining imposition portion 64, facing downward, is pressed against a longitudinally intermediate part of the upper face (a front surface on a plane of paper of FIG. 10) of the body portion 41 of the resin member 40. Hereby, the resin member 40 is positioned in place and is held in a predetermined posture. In this state, to-be-joined positions between the coil terminals 18u, 18v, 18w of the three-phase stator coil 16 and one ends 32u, 32v, 32w of the power lines 31 (FIG. 2) are placed on an outer side in the radial direction of the stator 14 relative to the resin member 40, when viewed from the upper side to the lower side in FIG. 10.

Then, by use of another jig (not shown), the one ends 32u, 32v, 32w of the power lines 31 of respective phases of the power-line integrated member 30 (FIG. 2) and respective end portions of the coil terminals 18u, 18v, 18w of corresponding phases are put on top of one another and held. The respective end portions extend axially.

In this state, as illustrated in FIG. 9, a welding torch 65 is moved downward from above the stator 14, so that the one ends 32u, 32v, 32w of the power lines 31 are joined to the coil terminals 18*u*, 18*v*, 18*w* by the welding torch 65. When the welding torch 65 is moved downward in FIG. 9, the terminal metal fittings 34 of the power lines 31 extend along the axial direction (an up-down direction in FIG. 9) of the stator 14, and the L-shaped bus bars 25 have not been connected to the terminal metal fittings 34 yet. This makes it possible to easily prevent the end portions of the power lines 31 from disturbing a welding operation, thereby making it possible to attain improvement of workability of the connection operation between the power lines 31 and the three-phase stator coil 16.

Further, as illustrated in FIG. 10, in a case where the stator 14 and the resin member 40 are viewed from the upper side to the lower side, when a circle (a circle indicated by an alternate long and two short dashes line in FIG. 10) is drawn around each of the joining portions Pu, Pv, Pw with a predetermined radius, the resin member 40 and the jig 60 hardly interfere with the circle. As the predetermined radius is larger, the workability of the welding operation can be improved, and further, heat by the welding torch 65 (FIG. 9) is easily prevented from affecting peripheral parts and the jig 60. In the embodiment, the inward projections 42 largely projecting toward an opposite side (downward in FIG. 10) to the terminal block 21 are formed on both ends of the resin member 40 in the longitudinal direction (the Y-direction). Further, the outward projections 44 having small projection amounts toward a terminal-block-21 side are formed in an intermediate part of the resin member 40 in the longitudinal direction. Hereby, in a case where the joining portions Pu, Pv, Pw are placed on the side surface (the upper face in FIG. 10) of the resin member 40 on the terminal-block-21 side and around the intermediate part in the longitudinal direction, and in both ends of the resin member 40 in the longitudinal direction and around a radially outer side of the stator 14, the predetermined radius is easily increased. This makes it possible to improve the workability of the welding operation and to restrain an adverse effect by heat at the time of welding.

In a state where the power-line integrated member 30 is connected to the stator coil 16, the stator 14 is fixed inside the case 12, as illustrated in FIG. 1. At this time, a core-side attachment portion (not shown) provided on an outer peripheral surface of the stator core 15 can be connected, by bolts or the like, to a case-side attachment portion (not shown) formed in the case 12. Then, as described above, the inner base portions 22*b* of the terminal block 21 are inserted through the insertion holes from outside the case 12. The inner base portions 22*b* may be inserted inside the case 12 before the stator 14 is fixed to the case 12. After that, the L-shaped bus bars 25 are inserted inside from outside the case 12, so that the internal relay terminals 24 of the terminal block 21 are connected to the terminal metal fittings 34 of the power lines 31. Hereby, the stator fixing structure 10 including the terminal block connection structure 20 is formed.

According to the terminal block connection structure 20, the resin member 40 is integrated with the distal side parts of the terminal metal fittings 34 relative to the bolts 50 used for the fixation between the power lines 31 and the terminal block 21. Hereby, in a case where a vibration of the power-line main body 33 of the power line 31 tends to increase, the resin member 40 relaxes the vibration. The power-line main body 33 is a part placed on one end side relative to the terminal metal fitting 34. A conceivable reason is as follows: at the time when the power-line main body 33 vibrates and the vibration is transmitted to the terminal block 21 via a fastening portion of the bolt 50, the resin member 40 deviates from a main vibration transmission path and the resin member 40 has a function of a dynamic vibration reducer. Because of this, at the time when the vibration is applied to the rotary electric machine, it is possible to reduce a stress to occur in the joining portion between one end of the power line 31 and the three-phase stator coil 16. This accordingly achieves improvement in durability of the joining portions Pu, Pv, Pw between the terminal block 21 and the power lines 31.

Further, the resin member 40 is integrated with the distal side parts of the terminal metal fittings 34 of the three power lines 31 relative to the bolts 50, so as to connect the three terminal metal fittings 34 to each other, thereby resulting in that vibrations of the three terminal metal fittings 34 are restrained each other via the resin member 40. This makes it possible to further restrain the vibrations of the terminal metal fittings 34. On this account, when the vibrations of the power-line main bodies 33 tend to increase, an effect of relaxing the vibrations becomes higher. This accordingly makes it possible to more reduce stresses to occur in the joining portions Pu, Pv, Pw.

Further, since the three terminal metal fittings 34 are connected, it is possible to improve workability at the time of assembling the terminal metal fittings 34 to the terminal block 21. More specifically, in a state where one terminal metal fitting 34 is fastened to the L-shaped bus bar 25 of the terminal block 21 by the bolt 50, movements of the other terminal metal fittings 34 are restricted. Hereby, at the time when the other terminal metal fittings 34 are fastened to the L-shaped bus bars 25 by the bolts, a part including the terminal metal fitting 34 that has been already fastened serves as whirl-stop. Further, at the time of joining of the power lines 31 to the stator coil 16 and at the time of assembling the terminal metal fittings 34 to the terminal block 21, the positioning of the resin member 40 can be easily performed by the jig 60. Hereby, the resin member 40 can be used as a reference of the lay out at the time of the joining and at the time of the assembling, thereby making it possible to improve workability of a joining operation and an assembling operation. Further, since it is not necessary to form, in the terminal metal fitting 34, a hole in which a distal end of a jig for positioning the terminal metal fitting 34 is inserted, downsizing of the terminal metal fitting 34 is attainable.

Note that the bolt 50 is used as the fastening member for connecting the terminal metal fitting 34 to the terminal block 21 in the above description, but the nut 51 may be used as the fastening member, and arrangement positions of the bolt 50 and the nut 51 may be reversed to the embodiment.

Results of measurement performed to check an effect of the terminal block connection structure 20 of the embodiment are described. In the measurement, in the stator fixing structure 10 including the terminal block connection structure 20 of the embodiment and a stator fixing structure 10 including a terminal block connection structure 20 of a comparative example, a stress to occur in each joining portion Pu, Pv, Pw was measured. First described is the stator fixing structure of the comparative example with the use of FIGS. 11, 12.

Figure 11:
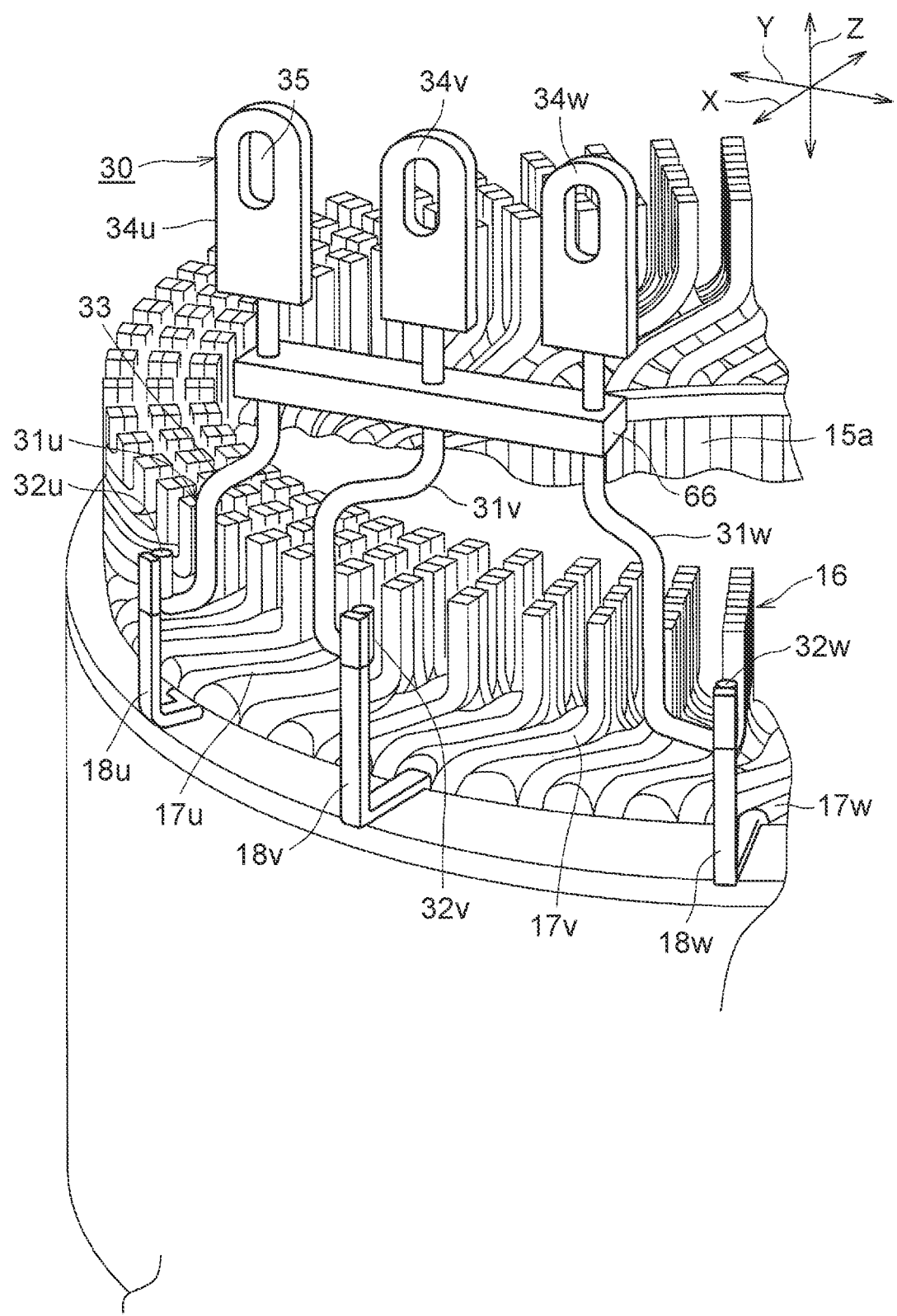
FIG. 11 is a view corresponding to FIG. 2 in a comparative example of the terminal block connection structure.
Figure 12:
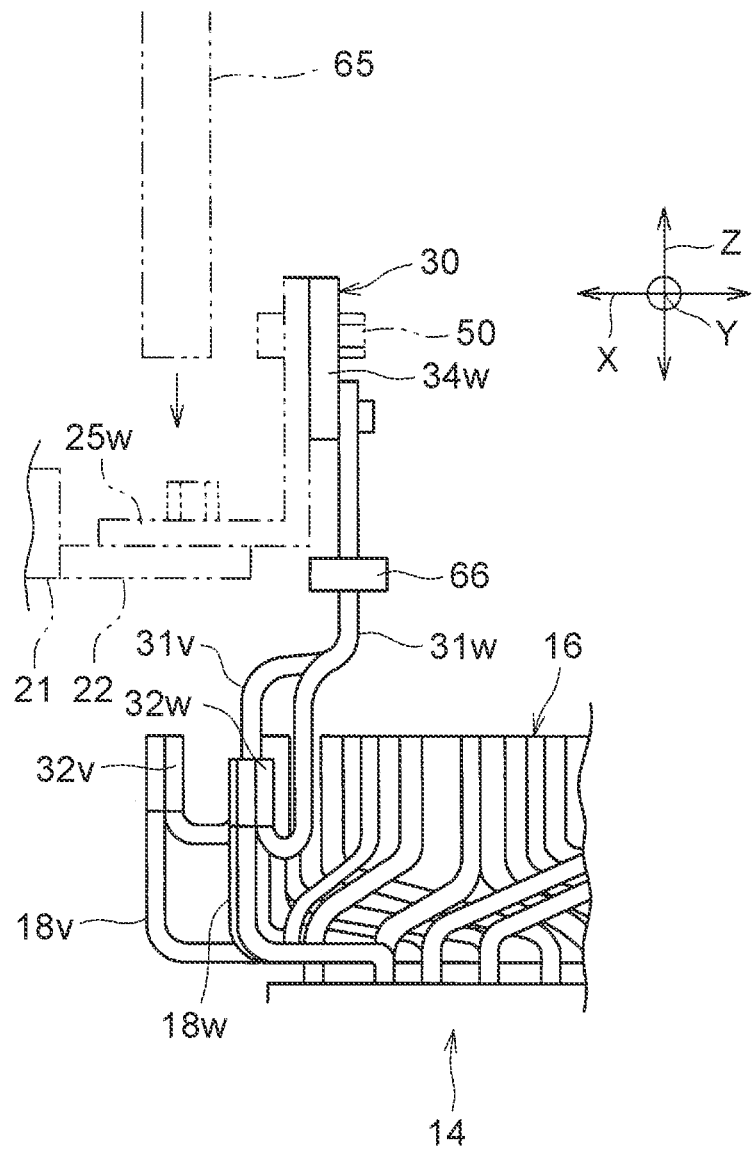
FIG. 12 is a view corresponding to FIG. 9 in the comparative example in FIG. 11.

FIG. 11 is a view corresponding to FIG. 2 in the comparative example of the terminal block connection structure. FIG. 12 is a view corresponding to FIG. 9 in the comparative example. In the comparative example, a resin member is not connected to distal ends of three terminal metal fittings 34. Instead of this, in the comparative example, an intermediate resin member 66 is connected to power-line main bodies 33 connected to respective terminal metal fittings 34, so that three power lines 31 are integrated with each other by the intermediate resin member 66. The intermediate resin member 66 is made of resin and is formed in a long rectangular-solid shape. Three through holes are formed in the intermediate resin member 66 so as to be distanced from each other in the longitudinal direction (the Y-direction). Respective intermediate parts of the power lines 31 are embedded in the intermediate resin member 66 in an integrated manner such that the respective intermediate parts of the three power lines 31 are inserted into the three through-holes. Then, one ends 32u, 32v, 32w of the power lines 31 are joined by welding to coil terminals 18u, 18v, 18w of a stator coil 16.

Further, as illustrated in FIG. 12, in the comparative example, the terminal metal fitting 34 provided in the other end (an upper end in FIG. 12) of the power line 31 is connected to a corresponding L-shaped bus bar 25 of the terminal block 21 by a bolt 50, similarly to the above embodiment illustrated in FIG. 9. In such a comparative example, the intermediate resin member 66 having a weight to some extent is connected to an intermediate part of the power line 31 on a stator-coil-16 side relative to a fastening portion of the bolt 50.

Figure 13:
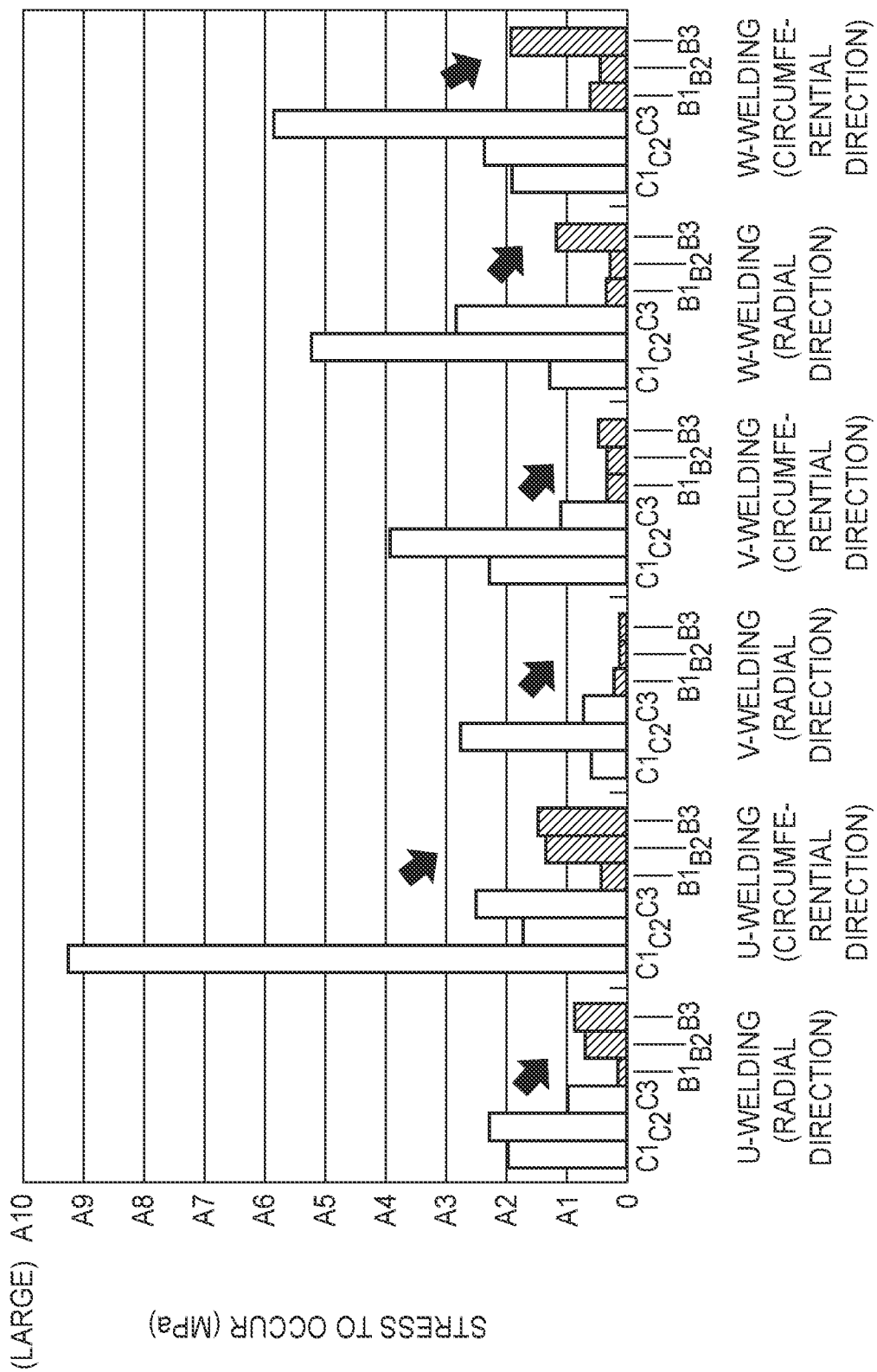
FIG. 13 is a view illustrating measurement results of stresses to occur in the joining portions in the stator fixing structure including the terminal block connection structure of the embodiment, in comparison with the comparison example.

Then, stresses to occur in the joining portions Pu, Pv, Pw of the power lines 31 were measured in terms of the stator fixing structure of the embodiment and the stator fixing structure of the comparative example in FIGS. 11, 12. FIG. 13 is a view illustrating measurement results (B1, B2, B3) of the stresses to occur in respective joining portions in the stator fixing structure of the embodiment, in comparison with the comparison example (C1, C2, C3). In the measurement, distortion gauges were attached to respective joining portions of the U phase, the V phase, and the W phase along the radial direction of the stator 14, and stresses were measured in terms of tension in the radial direction. The stresses thus measured are referred to as U-welding (the radial direction), V-welding (the radial direction), and W-welding (the radial direction). Further, distortion gauges were attached to respective joining portions of the U phase, the V phase, and the W phase along a circumferential direction of the stator 14, and stresses were measured in terms of tension in the circumferential direction. The stresses thus measured are referred to as U-welding (the circumferential direction), V-welding (the circumferential direction), and W-welding (the circumferential direction). At this time, the distortion gauges can be attached to the joining portions of the coil terminals 18u, 18v, 18w, for example. Further, three directions perpendicular to each other are taken as vibration directions, and when vibrations were applied in respective vibration directions, stresses in the joining portions were measured.

Figure 14:
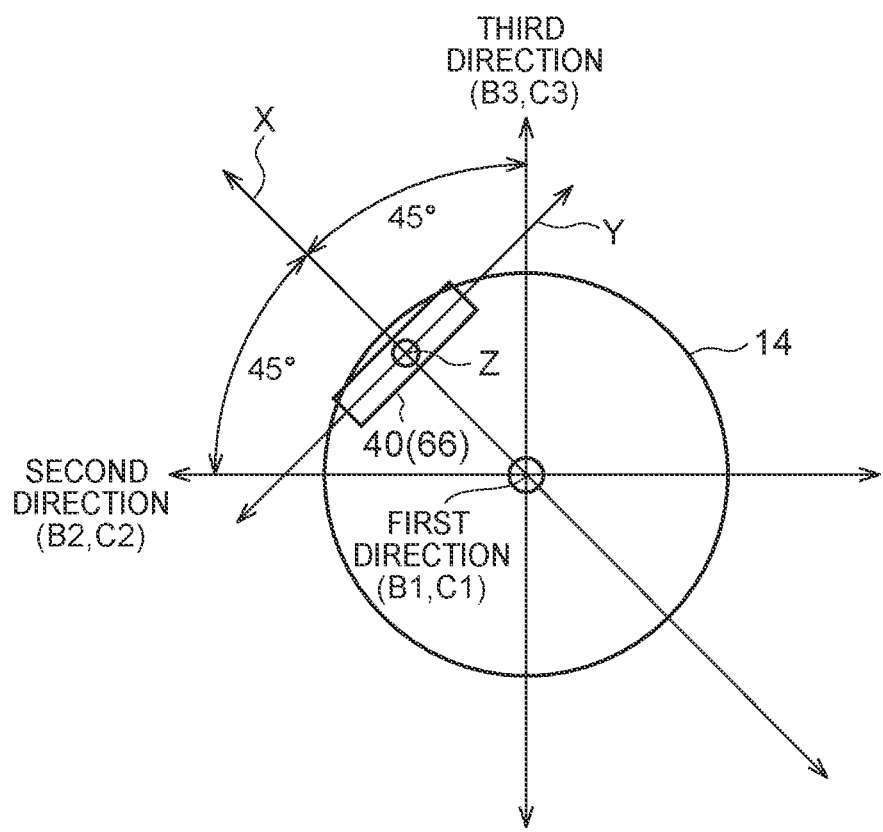
FIG. 14 is a schematic view illustrating a relationship between positions of the stator and the resin member and a first direction, a second direction, and a third direction used as vibration directions at the time of measuring stresses to occur in the joining portions.

FIG. 14 is a schematic view illustrating a relationship between positions of the stator 14 and the resin member 40 and a first direction, a second direction, and a third direction used as the vibration directions at the time of measuring the stresses to occur in the joining portions. FIG. 14 illustrates a state where the stator 14 is illustrated as a circle and the stator 14 is viewed axially. At this time, a direction along a central axis of the stator 14 is prescribed as the first direction. The first direction is parallel to the Z-direction. In terms of a direction (the X-direction) that connects a center of the resin member 40, 66 in its longitudinal direction (the Y-direction) to the central axis of the stator 14, two perpendicular axes are prescribed on both sides of the resin member 40, 66 such that respective angles with respect to an axis along the X-direction are 45°. Respective directions along the two perpendicular axes are prescribed as the second direction and the third direction. In a case where the rotary electric machine is provided in a vehicle, the first direction, the second direction, and the third direction can be assumed a front-rear direction, a right-left direction, and an up-down direction of the vehicle, respectively.

In the measurement, in a case where a vibration is applied in the first direction at a predetermined amplitude and a predetermined frequency, a measurement result of a stress in a joining portion in the embodiment is indicated by B1, and a measurement result in a joining portion in the comparative example is indicated by C1. Further, in a case where a vibration is applied in the second direction at a predetermined amplitude and a predetermined frequency, a measurement result of a stress in a joining portion in the embodiment is indicated by B2, and a measurement result in a joining portion in the comparative example is indicated by C2. Furthermore, in a case where a vibration is applied in the third direction at a predetermined amplitude and a predetermined frequency, a measurement result of a stress in a joining portion in the embodiment is indicated by B3, and a measurement result in a joining portion in the comparative example is indicated by C3.

In a vertical axis in FIG. 13, values of the stresses in the joining portions, obtained in the measurement results, are indicated by reference signs A1, A2 . . . for substitution. Differences between respective values indicated by the reference signs A1, A2, . . . are the same.

As understood from the measurement results in FIG. 13, the stresses to occur in the joining portions could be largely reduced in the embodiment as compared with the comparative example in all the vibration directions.

Note that the embodiment deals with the configuration in which three terminal metal fittings 34 are connected to each other by the resin member 40. In the meantime, respective resin members may be connected to the terminal metal fittings 34 on a distal side relative to the fastening members such as bolts, and the respective resin members thus connected to the terminal metal fittings 34 may be distanced from each other without being connected to each other. Even in such a configuration, similarly to the embodiment illustrated in FIGS. 1 to 11, when a vibration of the power-line main body tends to increase, the resin members relax the vibration, thereby making it possible to reduce an occurrence of a stress in the joining portion between the power line and the stator coil. In the meantime, in this configuration, the three terminal metal fittings 34 are not connected by the resin members, so it may be difficult to perform positioning of the terminal metal fittings by a jig at the time of a welding operation and an assembling operation. At this time, a through-hole for jig insertion may be formed in part of the terminal metal fitting, so that the terminal metal fitting can be moved and held in place while a jig is inserted into the through-hole.

Further, the embodiment deals with the configuration in which the resin member 40 is integrated with the three terminal metal fittings 34 of the three power lines 31. In the meantime, only one or two of the three terminal metal fittings may be configured such that the resin member is integrated with its distal side part relative to the fastening member.

Further, the above description deals with a case where the three-phase stator coil 16 of the stator 14 is formed by connecting conductor segments. In the meantime, the arrangement of the three-phase stator coil 16 in the stator core 15 is not limited to the configuration illustrated in FIGS. 1, 2, but the stator coil can employ various arrangement configurations, provided that the configurations have axially extending coil terminals of three phases.

What is claimed is:

1. A terminal block connection structure for a rotary electric machine, comprising:
   a plurality of power lines configured such that respective first end portions are joined to stator coils of a plurality of phases in the rotary electric machine;
   a plurality of terminal metal fittings provided in respective second end portions of the plurality of power lines, the respective second end portions being provided on an opposite side to the respective first end portions of the plurality of power lines;
   a terminal block to which the terminal metal fittings are fixed by respective fastening members, the terminal block being configured such that a plurality of power-source lines is connected to the terminal block and the terminal metal fittings are fixed to the terminal block by the respective fastening members so that the plurality of power lines is connected to the plurality of power-source lines, respectively; and
   a resin member integrated with a distal side part of at least one of the terminal metal fittings on an opposite side to the power lines across its corresponding fastening member, wherein
   each of the terminal metal fittings includes projections projecting outwardly in a width direction that are respectively provided on both side surfaces of a distal end of the each of the terminal metal fittings, the distal end of the each of the terminal metal fittings being integrated with the resin member; and
   each of the projections include a through hole.

2. The terminal block connection structure for the rotary electric machine, according to claim 1, wherein the resin member connects the plurality of terminal metal fittings to each other such that the resin member is integrated with distal side parts of the terminal metal fittings of the plurality of power lines on the opposite side to the power lines across the fastening members.

3. The terminal block connection structure for the rotary electric machine, according to claim 1, wherein each of the terminal metal fittings is integrated with the resin member by resin molding.

4. The terminal block connection structure for the rotary electric machine, according to claim 1, wherein:
   the resin member is made of insulating resin; and
   the resin member includes a body portion elongated along one direction, and two inward projections provided integrally at both ends of the body portion.

5. The terminal block connection structure for the rotary electric machine, according to claim 4, wherein the body portion of the resin member includes outward projections projecting toward the terminal block and provided at four positions distanced from each other in a longitudinal direction.

6. The terminal block connection structure for the rotary electric machine, according to claim 1, wherein the each of the plurality of power lines includes, in the respective first end portions, a conductive wire that is directly connected to a respective one of the plurality of terminal metal fittings in the second end portions.

7. The terminal block connection structure for the rotary electric machine, according to claim 6, wherein each of the plurality of terminal metal fittings includes a proximal end having a surface that is in direct contact with the terminal block.

8. A terminal block connection structure for a rotary electric machine, comprising:
   a plurality of power lines configured such that respective first end portions are joined to stator coils of a plurality of phases in the rotary electric machine;
   a plurality of terminal metal fittings provided in respective second end portions of the plurality of power lines, the respective second end portions being provided on an opposite side to the respective first end portions of the plurality of power lines;
   a terminal block to which the terminal metal fittings are fixed by respective fastening members, the terminal block being configured such that a plurality of power-source lines is connected to the terminal block and the terminal metal fittings are fixed to the terminal block by the respective fastening members so that the plurality of power lines is connected to the plurality of power-source lines, respectively; and
   a resin member integrated with a distal side part of at least one of the terminal metal fittings on an opposite side to the power lines across its corresponding fastening member, wherein
   the resin member is made of insulating resin; and
   the resin member includes a body portion elongated along one direction, and two inward projections provided integrally at both ends of the body portion.

9. The terminal block connection structure for the rotary electric machine, according to claim 8, wherein the body portion of the resin member includes outward projections projecting toward the terminal block and provided at four positions distanced from each other in a longitudinal direction.

10. A terminal block connection structure for a rotary electric machine, comprising:
    a plurality of power lines configured such that respective first end portions are joined to stator coils of a plurality of phases in the rotary electric machine;
    a plurality of terminal metal fittings provided in respective second end portions of the plurality of power lines, the respective second end portions being provided on an opposite side to the respective first end portions of the plurality of power lines;
    a terminal block to which the terminal metal fittings are fixed by respective fastening members, the terminal block being configured such that a plurality of power-source lines is connected to the terminal block and the terminal metal fittings are fixed to the terminal block by the respective fastening members so that the plurality of power lines is connected to the plurality of power-source lines, respectively; and
    a resin member integrated with a distal side part of at least one of the terminal metal fittings on an opposite side to the power lines across its corresponding fastening member, wherein
    the each of the plurality of power lines includes, in the respective first end portions, a conductive wire that is directly connected to a respective one of the plurality of terminal metal fittings in the second end portions, and
    each of the plurality of terminal metal fittings includes a proximal end having a surface that is in direct contact with the terminal block.

11. The terminal block connection structure for the rotary electric machine, according to claim 10, wherein each of the plurality of terminal metal fittings include a distal end that is integrated with the resin member.

* * * * *